C. F. C. MORRIS.
NON-SLIPPING TIRE.
APPLICATION FILED NOV. 30, 1907.
952,014. Patented Mar. 15, 1910.
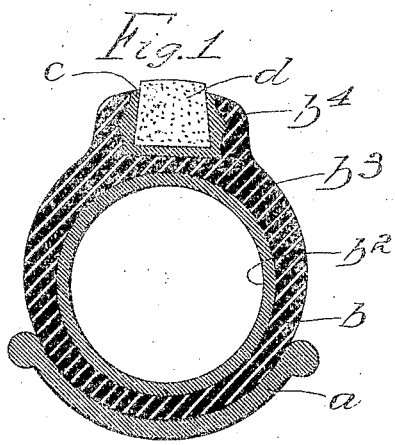
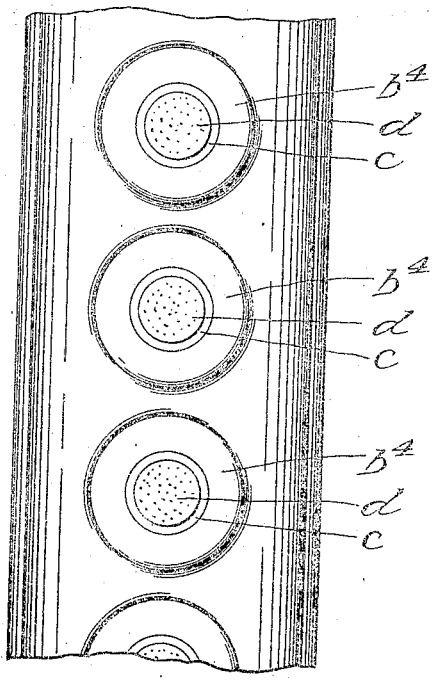
WITNESSES:
INVENTOR
Charles F. C. Morris
BY Edgar Tate & Co.
ATTORNEYS

UNITED STATES PATENT OFFICE.

CHARLES FRANK CONWAY MORRIS, OF STAMFORD HILL, LONDON, ENGLAND.

NON-SLIPPING TIRE.

952,014.

Specification of Letters Patent. Patented Mar. 15, 1910.

Application filed November 20, 1907. Serial No. 402,990.

*To all whom it may concern:*

Be it known that I, CHARLES FRANK CONWAY MORRIS, a subject of the King of Great Britain, and residing at Stamford Hill, London, England, have invented certain new and useful Improvements in Non-Slipping Tires, of which the following is a specification, such as will enable those skilled in the art to which it appertains to make and use the same.

This invention relates to what are known as elastic and pneumatic tires for the wheels of automobiles and similar vehicles; and the object thereof is to provide an improved tire or tires of this class having means for preventing what is known as "skidding" in the operation of the automobile or vehicle, and with this and other objects in view the invention consists in a tire of the class specified constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a transverse section of the rim of a wheel provided with a tire made according to my invention, and Fig. 2 is a face view of a part of said tire.

In the accompanying drawing I have shown at $a$ the rim of a wheel on which is mounted a pneumatic tire $b$ comprising an inner inflatable tube $b^2$ and an outer bearing or tread portion $b^3$ of rubber, rubber and canvas or other suitable material. The outer bearing or tread portion $b^3$ of the tire is provided at intervals on its bearing or tread surface with raised or projecting legs or elevations $b^4$ which are preferably circular in form, and in which are cast, molded or otherwise secured insert casings $c$ composed of any suitable metal and provided with plugs or cores $d$ of any suitable non-slipping material, such as fiber, pigskin, leather, twisted and tarred hemp, wood or the like, and these plugs or cores project slightly beyond the surface of the insert casings $c$.

The insert casings $c$ with their plugs or cores $d$ are intended to prevent slipping or skidding, and in practice they will be found to successfully accomplish this result, and by placing said insert casings in the projections or elevations $b^4$ of the tire, the said tire is strengthened and rendered more durable.

The outer or bearing tread portion $b^3$ of the tire, except as herein specified, may be constructed in any desired manner, and may be secured to the rim $a$ of the tire in any preferred way.

Having fully described my invention, what I claim as new and desire to secure by Letters Patent is:

A pneumatic tire composed of two parts, the outer or tread part being composed of elastic material and provided at intervals with projections, and insert casings secured in said projections and provided with core plugs of non-slipping material.

In testimony that I claim the foregoing as my invention I have signed my name in presence of the subscribing witnesses this 4th day of November 1907.

CHARLES FRANK CONWAY MORRIS.

Witnesses:
FREDERICK GEORGE LANE,
FREDERICK THOMAS MEEK.